(12) United States Patent
Yumura et al.

(10) Patent No.: US 6,554,107 B2
(45) Date of Patent: Apr. 29, 2003

(54) ELEVATOR SYSTEM

(75) Inventors: Takashi Yumura, Tokyo (JP); Hiroshi Araki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/963,383

(22) Filed: Sep. 27, 2001

(65) Prior Publication Data

US 2003/0057030 A1 Mar. 27, 2003

(51) Int. Cl.⁷ ................................................. B66B 1/28
(52) U.S. Cl. .................... 187/247; 187/394; 187/391
(58) Field of Search ................................ 187/247, 248, 187/391, 393, 394

(56) References Cited

U.S. PATENT DOCUMENTS

| | | | | |
|---|---|---|---|---|
| 5,151,562 A | * | 9/1992 | Fujita et al. ................ | 187/394 |
| 5,223,680 A | * | 6/1993 | Schmidt-Milkau et al. . | 187/391 |
| 5,393,941 A | * | 2/1995 | Mizuno et al. .............. | 187/293 |
| 5,682,024 A | * | 10/1997 | Koopman et al. .......... | 187/283 |
| 6,206,142 B1 | * | 3/2001 | Meacham .................... | 187/392 |
| 6,253,879 B1 | * | 7/2001 | Skalski et al. .............. | 187/287 |
| 6,333,865 B1 | * | 12/2001 | Yumura et al. ............. | 187/295 |

FOREIGN PATENT DOCUMENTS

| | | | | |
|---|---|---|---|---|
| JP | 49-26953 | | 3/1974 | |
| JP | 55-2537 A | | 1/1980 | |
| JP | 56-132276 A | | 10/1981 | |
| JP | 05116871 A | * | 5/1993 | ........... B66B/11/02 |
| JP | 6-316383 A | | 11/1994 | |
| JP | 8-198538 | | 6/1996 | |
| JP | 11150505 A | * | 6/1999 | ........... H04B/7/26 |

* cited by examiner

*Primary Examiner*—Jonathan Salata
(74) *Attorney, Agent, or Firm*—Leydig, Voit & Mayer, Ltd.

(57) ABSTRACT

In an elevator system, a first transceiver located at a fixed portion in an elevator shaft and a second transceiver provided at an elevator cage communicate by millimeter waves. The elevator system includes a first portion positioned in an elevator shaft, a second portion positioned in the elevator shaft, vertically moving relative to the first portion, a first transceiver located at the first portion, and a second transceiver located at the second portion.

16 Claims, 6 Drawing Sheets

ELEVATOR SYSTEM

BACKGROUND OF THE INVENTION

1) Technical Field of the Invention

The present invention relates to an elevator system and, in particular, relates to the elevator system having an elevator cage vertically moving along an elevator shaft.

2) Description of Related Arts

An elevator cage moving along the elevator shaft constructed in a building, in general, communicates with a control board, fixed on the building, through a cable.

Usage of the cable for data communication causes various disadvantages. For example, at least a part of the weight of the cable is loaded on the elevator cage in a lopsided manner. The lopsided load of the cable on the elevator cage varies depending upon the position of the elevator cage. Thus, the cable can swing when the elevator cage moves, which gives an adverse effect to the elevator cage. Also, an extra space is required for receiving the cable.

In order to eliminate the disadvantages, JP 49-26953 (A) proposes the elevator system including a coaxial cable extending along the elevator shaft and an antenna provided with the elevator cage for communicating with the coaxial cable in a non-contact manner. Further, according to the prior art elevator system, the coaxial cable has to be positioned along the elevator shaft. In case where the elevator system is constructed in a tall building having height more than several hundred meters, especially like a skyscraper, the coaxial cable is quite long and heavy. Therefore, the construction and the maintenance require enormous work and cost.

Also, JP 55-2537 (A) discloses another elevator system including a transmitter provided at the elevator cage, or at the uppermost (or lowermost) portion of the elevator shaft. It also discloses a technique for detecting the position of the elevator cage in the elevator shaft in accordance with a phase shift or a delay time between an electromagnetic wave transmitted from the transmitter and the reflection wave reflected at the elevator cage or at the uppermost (or lowermost) portion of the elevator shaft. The description of the prior art indicates use of ultrasonic and electromagnetic waves, such as visible light, ultraviolet, and infrared. However, usage of the ultrasonic waves causes insufficient accuracy for detection, and electromagnetic waves having wavelengths close to that of visible light are susceptible to dust and smoke so that such they can hardly be received in a reliable manner.

SUMMARY OF THE INVENTION

The present invention is addressed to those aforementioned problem, the object of the present invention is to provide an elevator system, in which data communication between a first transceiver provided at a fixed portion in an elevator shaft and a second transceiver provided at an elevator cage is made by means of a millimeter wave.

The elevator system according to the first aspect of the present invention comprises: a first portion positioned in an elevator shaft; a second portion positioned in the elevator shaft, vertically moving relative to the first portion; a first transceiver provided at the first portion; and a second transceiver provided at the second portion; wherein data communication is made between the first and second transceivers by means of a millimeter wave. Data communication by means of a millimeter wave can be made between the first and second portions at a high rate and in a reliable manner.

The elevator system according to the second aspect of the present invention comprises: a first portion positioned in an elevator shaft; a second portion positioned in the elevator shaft, vertically moving relative to the first portion; and a transceiver provided at either one of the first and second portions, for transmitting a millimeter wave to the other one of the first and second portions, and for receiving the millimeter wave reflected at the other one of the first and second portions, so as to determine a distance between the first and second portions. Thus, the distance between the first and second portions can be measured in a precise manner so as to assure a safe motion of the elevator cage.

In the elevator equipment according to the present invention, either one of the first and second transceivers transmits the millimeter wave and then receives the millimeter wave reflected at the other one of the first and second portions, so as to determine a distance between the first and second portions. Therefore, data communication by means of a millimeter wave can be made between the first and second portions at a high rate and in a reliable manner. Also, the distance between the first and second portions can be measured in a precise manner so as to assure a safe motion of the elevator cage.

The elevator system according to the third aspect of the present invention comprises: a) a first portion positioned in an elevator shaft; b) a second portion positioned in the elevator shaft, vertically moving relative to the first portion; c) a first transceiver provided at the first portion; and d) a second transceiver provided at the second portion; e) wherein each of the first and second transceivers includes, a carrier wave generator for generating a carrier wave, a modulator for modulating the carrier wave in accordance with communication data, a transmitter for transmitting the carrier wave modulated by the modulator towards other one of the transceiver, a receiver for receiving the carrier wave transmitted by other one of the transceiver, and a demodulator for demodulating the communication data modulated on the carrier wave received by the receiver; and f) wherein either one of the first and second transceivers includes a distance calculator for calculating a distance between the first and second portions in accordance with the reference signal. In the elevator system so constructed, data communication and detection of the distance between the first and second portions can be achieved without using a cable.

The elevator system according to the fourth aspect of the present invention comprises: a) a first portion positioned in an elevator shaft; b) a second portion positioned in the elevator shaft, vertically moving relative to the first portion; c) a first transceiver provided at the first portion; and d) a second transceiver provided at the second portion; e) wherein either one of the first and second transceivers includes, a carrier generator for generating a carrier wave, a transmitter for transmitting the carrier wave towards other one of the transceiver; f) the other one of the first and second transceivers includes, a receiver for receiving the carrier wave transmitted by one of the transceiver, a modulator for modulating the carrier wave in accordance with communication data, and a transmitter for transmitting the carrier wave modulated by the modulator towards other one of the transceiver; and g) wherein one of the first and second transceivers further includes, a receiver for receiving the carrier wave transmitted from the other one of the transceiver, a demodulator for demodulating the communication data modulated on carrier wave received by the receiver, wherein either one of the first and second transceivers includes a distance calculator for calculating a distance between the first and second portions in accordance with the carrier wave. The elevator system so constructed advantageously eliminates the carrier generator for generating the carrier wave in the other transceiver.

The elevator equipment according to the present invention further comprises a speed calculator for calculating a moving speed of the second portion relative to the first portion, based upon the distance therebetween; and a speed controller for controlling the moving speed of the second portion. Thus, the moving speed of the second portion can be controlled in a precise manner based upon the calculated moving speed.

The elevator equipment according to the present invention, further comprises a power source extending along the elevator shaft; and a power inductor provided at the second portion for receiving a power from the power source due to electromagnetic induction in a non-contact manner; wherein the second transceivers is supplied with the power from the power inductor. Thus, a power cable is eliminated, which is otherwise necessary for supplying the power with the second portion.

Further, the elevator equipment according to the present invention, further comprises a brake device for braking a driver of the second portion when the distance between the first and second portions calculated by the distance calculator is less than a predetermined danger distance. To this end, a bump between the first and second portions can be prevented.

Further, the elevator equipment according to the present invention, further comprises a power cutoff for disabling the power source for supplying the power with the power inductor when the distance between the first and second portions calculated by the distance calculator is less than a predetermined danger distance. To this end, a bump between the first and second portions can be prevented.

It should be noted that, in the elevator equipment according to the present invention, the carrier wave is a millimeter wave.

The elevator system according to the fifth aspect of the present invention comprises: a) a fixed portion positioned in an elevator shaft; b) a first movable portion vertically moving in the elevator shaft relative to the fixed portion; c) a second movable portion positioned in the elevator shaft so that the first portion is intervened between the fixed portion and the second portion, the second portion vertically moving relative to the fixed portion and the first movable portion; and d) a first, second, and third transceivers provided at the fixed, first, and second portion, respectively; wherein the first and third transceivers communicates with each other through the second transceiver. To this end, the motions of the first and second portions can be controlled in a independent and safe manner.

Further scope of applicability of the present invention will become apparent from the detailed description given hereinafter. However it should be understood that the detailed description and specific examples, while indicating preferred embodiments of the invention, are given by way of illustration only, since various changes and modifications within the sprit and scope of the invention will become apparent to those skilled in the art from this detailed description.

BRIEF DESCRIPTION OF THE DRAWINGS

The present invention becomes more fully understood from the detailed description given hereinafter and accompanying drawings which are given by way of illustration only, and thus are not limitative of the present invention and wherein.

DETAILED DESCRIPTION OF THE PREFERRED EMBODIMENTS

Embodiment 1

Figure 1:
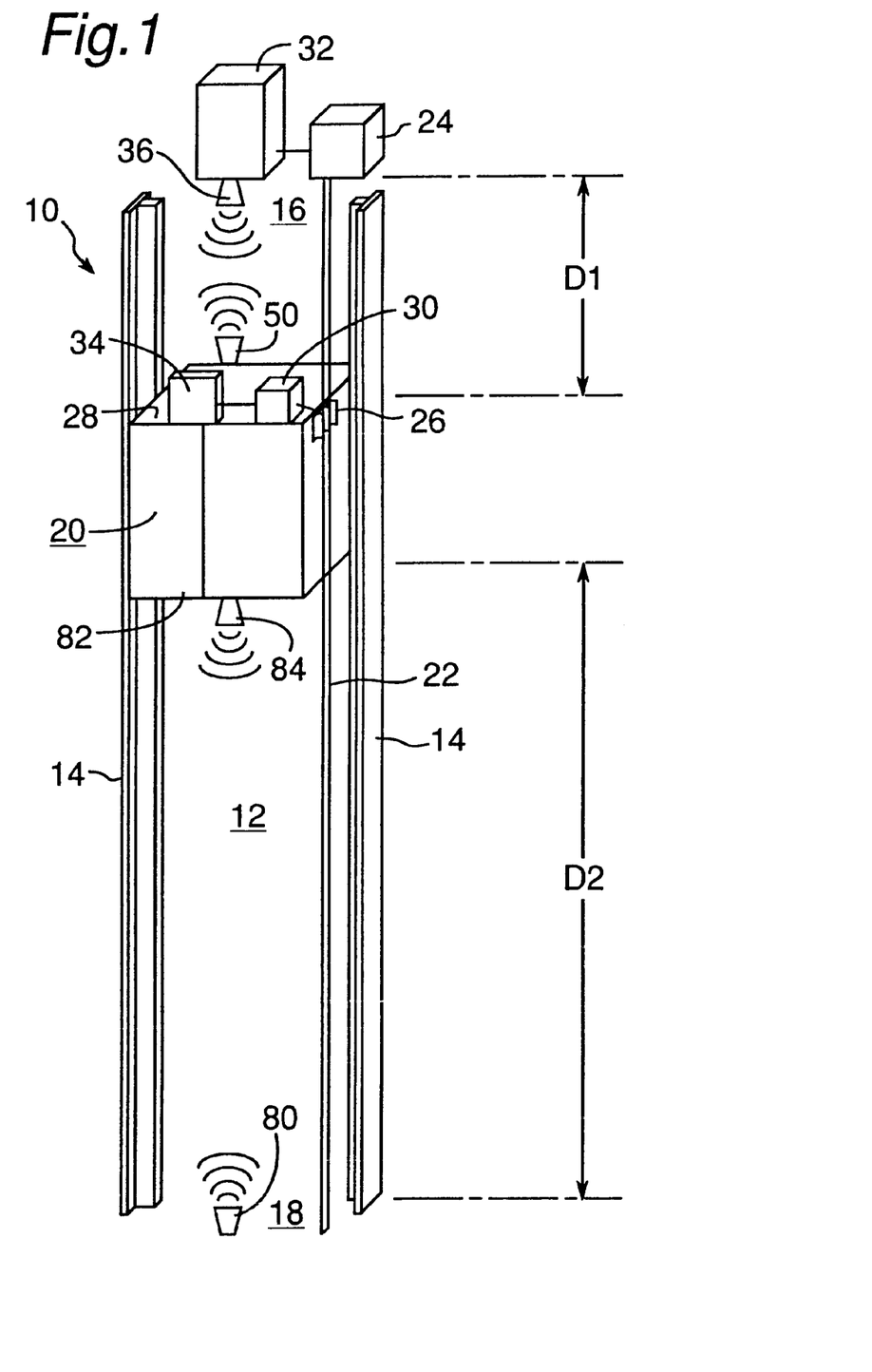
FIG. 1 is a perspective view of the elevator system according to Embodiment 1 of the present invention.

FIG. 1 is a schematic view of an elevator system according to Embodiment 1 of the present invention. In general, the elevator system 10 of Embodiment 1 is constructed at appropriate sites in the buildings, where a pair of opposing side walls (not shown) is provided for defining an elevator shaft (vertical passage) 12. Positioned on each of the side walls is a guide rail 14 extending in the vertical direction. Also, provided between an uppermost portion 16 and a lowermost portion 18 (referred to as first or fixed portion) in the elevator shaft 12 is an elevator cage 20 (referred to as a second portion). The elevator cage 20 may be a rope-less type elevator system having a linear motor, or a suspending type elevator system driven by a drum elevating device suspended on the ceiling of the elevator shaft 12.

The elevator system 10 also comprises a power source or power line 22 continuously extending along the side walls of the elevator shaft 12. The power line 22 is electrically connected to a main power source (a primary source) 24 provided at a suitable site in the building, so that the main power source 24 supplies the alternating current to the power line 22. On the other hand, the elevator cage 20 includes a non-contact power inductor 26 opposing to the power line 24. The power inductor 26 is designed such that it is spaced away from the power line 24 with a predetermined gap, which is substantially constant while the elevator cage is moving. The power inductor 26 is provided at a suitable position on the elevator cage 20, which may be the ceiling 28 of the elevator cage 20 in the embodiment. Also the power inductor 26 is connected with a sub-power source (a secondary source) 30 provided at a suitable position on the elevator cage 20. Thus, when the main power source 24 supplies the alternating voltage to the power line 22, the power inductor 26 induces the alternating voltage based upon the alteration of the magnetic field generated around the power line 22. The induced alternating voltage is, if necessary, converted in an appropriate manner so that the sub-power source 30 feeds various control devices mounted on the elevator cage 20 such as a sub-control board 34. Therefore, usage of the power inductor 26 eliminates a power cable for supplying the power to the elevator cage 20, thus advantageously, the space and weight otherwise required for the power cable can be eliminated.

A variety of control devices for detecting the position or the moving speed, and for controlling the motion of the elevator cage 20 are provided with the first portion (the elevator shaft 12) and with the second portion (the elevator cage 20). In particular, a main control board 32 is arranged adjacent to the uppermost portion 16 of the elevator shaft 12. Also, a sub-control board 34 is positioned on the ceiling 28 of the elevator cage 20. In the embodiment, the main control board 32 is electrically connected with the main power source 24 for receiving the power therefrom.

Figure 2:
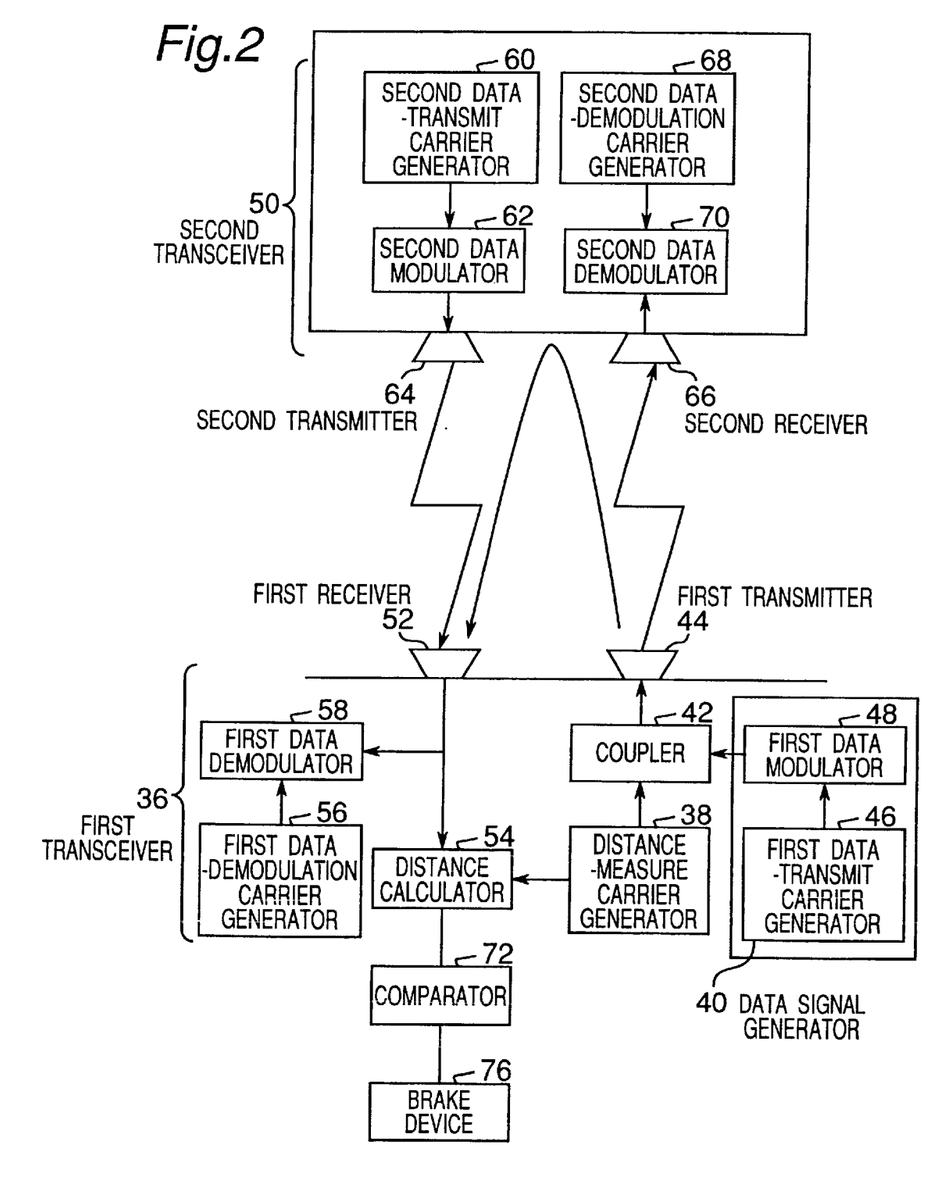
FIG. 2 is a block diagram of the elevator system of the transceivers of Embodiment 1, illustrating a structure thereof.

The main control board 32 is positioned adjacent to the uppermost portion 16 in the elevator shaft 12 and connected to a first transceiver 36, which is illustrated in detail in FIG. 2. The first transceiver 36 is used for measuring the distance D1 between the uppermost portion 16 of the elevator shaft 12 and the elevator cage 20, and also used for communicating control data signals such as a floor button signal and a door open-close signal with the elevator cage 20. In general, the first transceiver 36 includes a distance-measure carrier generator (reference signal generator) 38, a data signal generator 40, a coupler 42, and a first transmitter 44. The distance-measure carrier generator 38 generates a distance-measure carrier (carrier wave or reference signal) used for measuring the distance D1. Also as illustrated, the data signal generator 40 includes a first data-transmit carrier generator 46 for generating a first data-transmit carrier, and a first data modulator 48 for modulating the first data-transmit carrier in accordance with communication data signals that are to be communicated with the sub-control board 34. Thus, the data signal generator 40 generates a modulated carrier. And then, the coupler 42 couples the modulated carrier with the distance-measure carrier so that the first transmitter 44 transmits the coupled carrier towards the elevator cage 20, that is, to the sub-control board 34.

In addition, the first transceiver 36 also includes a first receiver 52, a distance calculator 54, a first data-demodulation carrier generator 56, and a first data demodulator 58. The first receiver 52 is used for receiving the carrier transmitted from a second transceiver 50 connected with the sub-control board 34. As will be described in detail below, the distance calculator 54 calculates the distance D1 between the uppermost portion 16 of the elevator shaft 12 and the elevator cage 20. Also, the first data-demodulation carrier generator 56 generates another carrier having a frequency same as that generated by a second data-transmit carrier generator 60. The first data demodulator 58 demodulates data signals modulated on the carrier transmitted from the sub-control board 34 to the first receiver 52 by means of the first data-demodulation carrier.

On the other hand, the sub-control board 34 includes the second transceiver 50 for communicating data signals with the main control board 32. The second transceiver 50 is positioned on the ceiling 28 of the elevator cage 20. The second transceiver 50 includes a second data-transmit carrier generator 60, a second data modulator 62, and a second transmitter 64. The second data-transmit carrier generator 60 is used for generating a second data-transmit carrier. The second data modulator 62 modulates the data-transmit carrier in accordance with another data signals to be communicated with the control board 32. Then the second transmitter 64 transmits the carrier modulated by the second data modulator 62 towards the elevator cage 20.

The second transceiver 50 also includes a second receiver 66, a second data-demodulation carrier generator 68, and a second data demodulator 70. The second receiver 66 receives the carrier transmitted from the first transmitter 44 of the first transceiver 36. The second data-demodulation carrier generator 68 is used for generating a data-demodulation carrier having the frequency same as that generated by the first data-transmit carrier generator 46. The second data demodulator 70 demodulates the data signals modulated on the carrier transmitted from the first transceiver 36 to the second receiver 66 by means of the second data-demodulation carrier.

It is very important to note that any carrier (carrier waves) communicated between the first and second transceivers 44, 64 are millimeter waves. This is advantageous because dusts and smokes are less likely to damp such millimeter waves, comparative to the visual light and laser beam. Also, since the millimeter wave has the wavelength shorter than those of the shortwave and the FM wave, it has a higher directivity which allows more information to be communicated and the measurement of the distance in a more precise manner.

Preferably, the millimeter wave has the frequency in the range between 40 to 100 GHz. More preferably, the millimeter wave having the frequency in the range between 55 to 65 GHz are substantially damped in the atmosphere so that no adverse effect is brought to any other devices disposed adjacent to the elevator system. In practical, the millimeter wave having the frequency of 60 GHz or more is most preferable.

Although not specifically mentioned but intended in the following description, the transceivers 36 and 50 communicate with each other by means of the millimeter wave.

The operations of the main control board 32 and the sub-control board 34 will be described hereinafter. As shown in FIG. 1, the main power source 24 and the sub-power source 32 supply the power to the main control board 32 and the sub-control board 34, respectively. Also, referring to FIG. 2, in the first transceiver 36 connected with the main control board 32, the distance-measure carrier generator 38 generates the distance-measure carrier used for measuring the distance. In case where the main control board 32 has any data signals to be transmitted to the sub-control board 34, the first data modulator 48 modulates the first data-transmit carrier in accordance with the data signals. Next, the distance-measure carrier and the first data-transmit carrier are coupled by the coupler 42, and then transmitted from the first transceiver 44 towards the elevator cage 20.

The carrier is transmitted from the first transmitter 44 and received by the second receiver 66 of the second transceiver on the elevator cage 20. Received carrier is forwarded to the second data demodulator 70, which demodulates the data signals modulated on the carrier by means of the second data-demodulation carrier having the frequency same as that generated by the first data-transmit carrier generator 46. Thus, the sub-control board 34 obtains the control data signals from the main control board 32. Also, the second data demodulator 70 extracts the distance-measure carrier by decoupling the coupled carrier. Thus, the sub-control board 34 controls the various control circuits provided therein in response to the data signals demodulated by the second data demodulator 70.

Meanwhile, the carrier transmitted from the first transmitter 44 also reflects at the elevator cage 20 back to the main control board 32 and then received by the first receiver 52. The carrier received by the first receiver 52 is forwarded to the distance calculator 54. Then, the distance calculator 54 calculates the distance D1 between the uppermost portion 16 of the elevator shaft 12 and the elevator cage 20, based upon a phase difference or a time delay appeared between the distance-measure carrier generated by the distance-measure carrier generator 38 and the carrier received by the first receiver 52. If desired, the moving speed of the elevator cage 20 is determined by differentiating the calculated distance D1 by time. Furthermore, the elevator cage 20 may have a portion where the millimeter wave is directed (i.e., the ceiling portion 28 of the elevator cage 20), which is preferably made of material used for facilitating the carrier to reflect as much as possible.

As shown in FIG. 2, a safety mechanism is preferably provided with the first transceiver 36 including a comparator 72 and a brake device 76. The comparator 72 compares the distance D1 calculated by the distance calculator 54 with a predetermined minimum safety distance, and if the former is determined to be less than the latter, then the brake device 76 is actuated to brake the motion of the driving motor. Alternatively, a cutoff (not shown) disables the power source for supplying the power when the distance D1 between the first and second portions is less than a predetermined danger distance (minimum safety distance).

In addition, the way how to transmit any data signals from the sub-control board 34 to the main control board 32 will be described hereinafter. The second data modulator 62 modulates the second data-transmit carrier generated by the second data-transmit carrier generator 60 in accordance with another data signals. Then, the carrier modulated by the second data modulator 62 is transmitted from the second transmitter 64 towards the main control board 32.

Then, the carrier transmitted from the second transmitter 64 is received by the first receiver 52 of the first transceiver 36. Received carrier is forwarded to the first data demodulator 58. The first data demodulator 58 demodulates the data signals modulated on the carrier received by the first receiver 52 by means of the first data-demodulation carrier. The first data-demodulation carrier generated by the first data-demodulation carrier generator 56 also has the frequency same as that generated by the second data-transmit carrier generator 60. Thus, the main control board 32 controls the various peripheral devices such as an driving motor 74, which are electrically connected to the main control board 32, based upon the data signals received from the elevator cage 20.

As described above, according to the elevator 10 of the embodiment, the millimeter wave is used for data communication between the first transceiver 36 fixed in the elevator shaft 12 and the second transceiver 50 positioned on the elevator cage 20. As above, the millimeter wave has the high directivity so that, advantageously, it allows data communication with more information and measurement of the distance D1 between the fist and second transceivers 36 and 50 in a more precise manner at a high speed. Also, the carrier of millimeter waves communicated between the transceivers advances straightly to each other, preventing reflection at the side walls so that any necessary information (data signals) can be retrieved from the received carrier in a reliable manner so as to ensure the safe operation of the elevator cage 20. To this end, the transceivers 36 and 50 allows the detection of the position and the moving speed of the elevator cage 20, and also secure the control data communication therebetween. Thus, the transceivers 36 and 50 eliminate a plurality of devices, one having a purpose of detecting the position and the moving speed, and another having another purpose of communicating the data signals so that the space and cost required by those separate devices can be reduced. In addition, the first and second transceivers 36 and 50 also allows a continuous detection of the position and the moving speed of the elevator cage 20. This is in contrast in the conventional devices for detecting the position and the moving speed, which comprises a plurality of the limit switches and the mechanical components such as cams. Furthermore, the switches and the cable for detecting the position and the moving speed of the elevator cage 20 can be eliminated so that the space and the cost otherwise necessary therefor can be eliminated. Also, as described above, usage of the non-contact power inductors 26 eliminates the power cable, or at least reduces the size thereof.

Although the embodiment describes the distance D1 between the uppermost portion 16 of the elevator shaft 12 and the elevator cage 20, instead of or together with the distance D1, as also shown in FIG. 1, an another distance D2 between the lowermost portion 18 of the elevator shaft 12 and the elevator cage 20 may be measured as well. In this instance, an another transceiver 80, similar to the first transceiver 36, is provided at the lowermost portion 18 of the elevator shaft 12. The transceiver 80 transmits the distance-measure carrier towards the bottom of the elevator cage 20 and receives the reflection so as to calculate the distance D2 between the lowermost portion 18 of the elevator shaft 12 and the elevator cage 20. Also, needless to mention, it is also preferable to determine whether the calculated distance D2 is less than the minimum safety distance (danger distance). And if so, the brake device 76 is activated to cause an emergent brake of the elevator cage 20. This is advantageous because the upward and downward movements of the elevator cage 20 can be controlled in a remarkably safe manner. An another advantage according to the embodiment is ability to continuously track the moving speed of the elevating cage 20 as well as the distance D1, D2 between the elevator cage 20 and the uppermost and/or the lowermost portions 16, 18. Thus, the motion of the elevator cage 20 can always be precisely monitored and controlled in advance before approaching within the minimum safety distance with information of the distance and the moving speed, especially in a smooth and safe manner.

As described above, data communication is made between the first transceiver 36 positioned adjacent to the uppermost portion 16 of the elevator shaft 12 and the second transceiver 50 arranged on the ceiling 28 of the elevator cage 20. Instead of, or in addition to data communication therebetween, data communication may be made between the transceiver 80 provided adjacent to the lowermost portion 18 in the elevator shaft 12 and the transceiver 84, that is similar to the second transceiver 50 and arranged on the bottom 82 of the elevator cage 20. When the transceiver 80 is electrically connected with the main control board 32, data communication between the main control board 32 and the sub-control board 34 can be shared by data communications between two pairs of the transceivers 36 and 50, 80 and 84.

Figure 3:
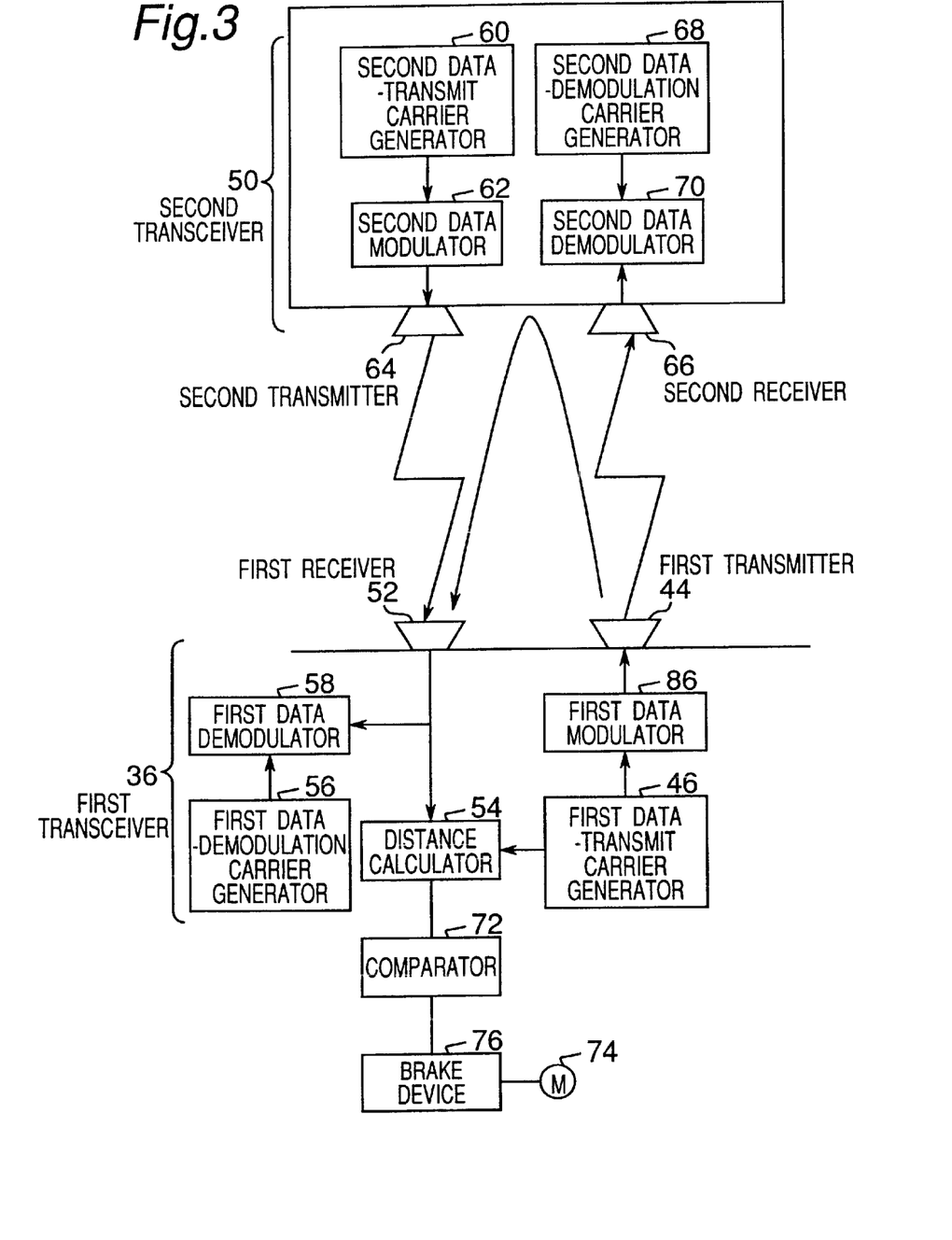
FIG. 3 is a block diagram of the elevator system of the transceivers of a modification of Embodiment 1, illustrating a structure thereof.

Also as discussed above with reference to FIG. 2, the distance D1 between the uppermost portion 16 in the elevator shaft 12 and the elevator cage 20 is detected with use of the distance-measure carrier generated by the distance-measure carrier generator 38 provided in the first transceiver 36. Contrary to this, as illustrated in FIG. 3, the distance-measure carrier generator 38 is eliminated, and the first data-transmit carrier generated by the first data modulator 46 may be used for determining the distance D1.

In the above description, the first transceiver 36 used for measuring the distance D1 is provided at the uppermost portion 16 in the elevator shaft 12, and the second transceiver 50 is positioned on the elevator cage 20. However, the first transceiver 36 and the second transceiver 50 may be positioned on the elevator cage 20 and at the uppermost portion 16 in the elevator shaft 12, respectively. In this instance, similar to the embodiment, the first transceiver 36 also includes the comparator 72 for detecting whether the elevator cage 20 is within the danger distance, and means for transmitting the comparison data signal to the second transceiver 50. Upon receiving the comparison data signal, the second transceiver 50 actuates the brake device 76 so as to brake the driving motor in case where the elevator cage 20 is approaching within the dangerous range.

Embodiment 2

Figure 4:
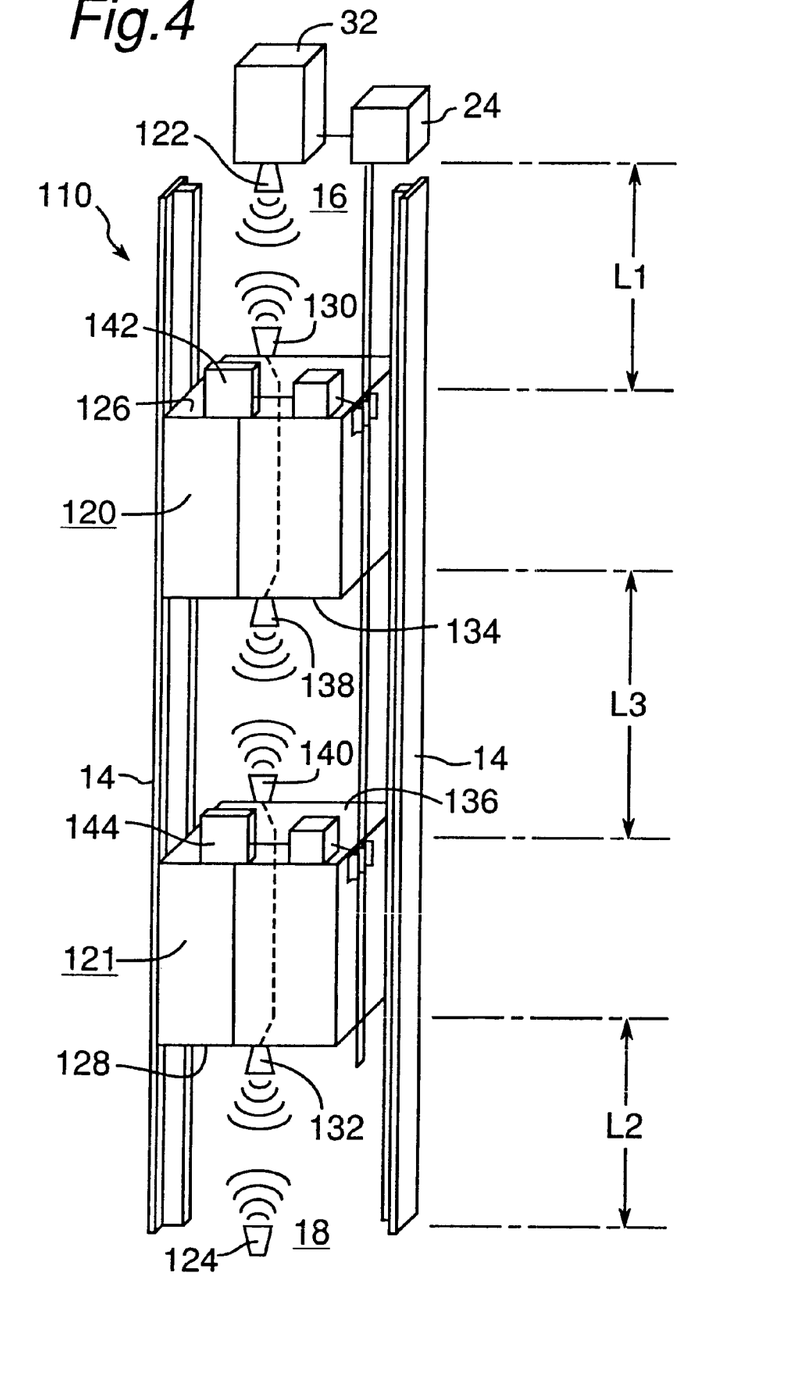
FIG. 4 is a perspective view of the elevator system according to Embodiment 2 of the present invention.

Although the elevator system of Embodiment 1 includes one elevator cage 20 provided in a single elevator shaft 12, the present invention can be applied to any type of the elevator system 110 having two elevator cages 20 as illustrated in FIG. 4, or having more than two elevator cages (not shown) in one elevator shaft 12.

As illustrated in FIG. 4, the elevator system 110 of the embodiment includes an upper and lower first transceivers 122 and 124, similar to the second transceiver 50 according to Embodiment 1. Also, the elevator system 110 includes an upper and lower elevator cages 120 and 121, in which an upper and lower second transceivers 130 and 132 are positioned on the ceiling 126 of the upper elevator cage 120, and on the bottom 128 of the lower elevator cage 121, respectively. This allows data communication between the upper first transceiver 122 located at the uppermost portion 16 and the upper second transceiver 130 of the upper elevator cage 120 so that the distance L1 between the uppermost portion 16 and the upper elevator cage 120 is measured and data signals are supplied to each other between the upper first and upper second transceivers 122, 130. Similarly, data communication is made between the lower first transceiver 124 located at the lowermost portion 18 and the lower second transceiver 132 provided on the bottom 128 of the lower elevator cage 121 so that the distance L2 between the lowermost portion 18 and the lower elevator cage 120 is measured and data signals are supplied to each other between the lower first and lower second transceivers 124 and 132.

Furthermore, in order to determine the distance L3 between the upper elevator cage 120 and the lower elevator cage 121, as illustrated in FIG. 4, an another transceiver similar to the first transceiver 122 may be provided either on the bottom 134 of the upper elevator cage 120 or the ceiling 136 of the lower elevator cage 121.

Alternatively, both of the transceivers 138 and 140, similar to the second transceiver, may be positioned on the bottom 134 of the upper elevator cage 20 and on the ceiling 136 of the elevator cage 121, respectively. Also, as indicated by the imaginary line in FIG. 4, the transceivers 138 and 140 are electrically connected with the second transceivers 130 and 132 that are provided at the same elevator cages 120 and 121, respectively. To this end, the main control board 32 may communicate with the sub-control boards 142 and 144 by means of the upper and lower first transceivers 122 and 124, the transceivers 130 and 138 of the upper elevator cage 120, and the transceivers 132 and 140 of the lower elevator cage 121.

According to the elevator system of the embodiment, data signals indicating the positions and the moving speeds of a plurality of the elevator cages, and data signals used for controlling the elevator cages can be communicated without any cables or data lines. Contrary to this, if the elevator system have a single elevator shaft receiving a plurality of elevator cages that communicates by means of the cables, disadvantageously, an upper cable connected with the upper elevator cage is likely to contact with the lower elevator cage, or the upper cable suspended from the upper elevator cage forces the space between the elevator cages to be redundantly extended. However, as described above, if the driving motor for driving the elevator cage is provided on the elevator cage, and is supplied with the power in a non-contact manner, the aforementioned disadvantages will be eliminated. Also, the millimeter wave allows data communication for determining the positions and the moving speeds in a prompt and precise manner. Even the elevator system has power cables or lines electrically connected with the main power source, data communication by means of millimeter waves according to the present invention causes the cable or line to be much smaller and thinner so that the space and weight for the cable can be significantly reduced.

Embodiment 3

Figure 5:
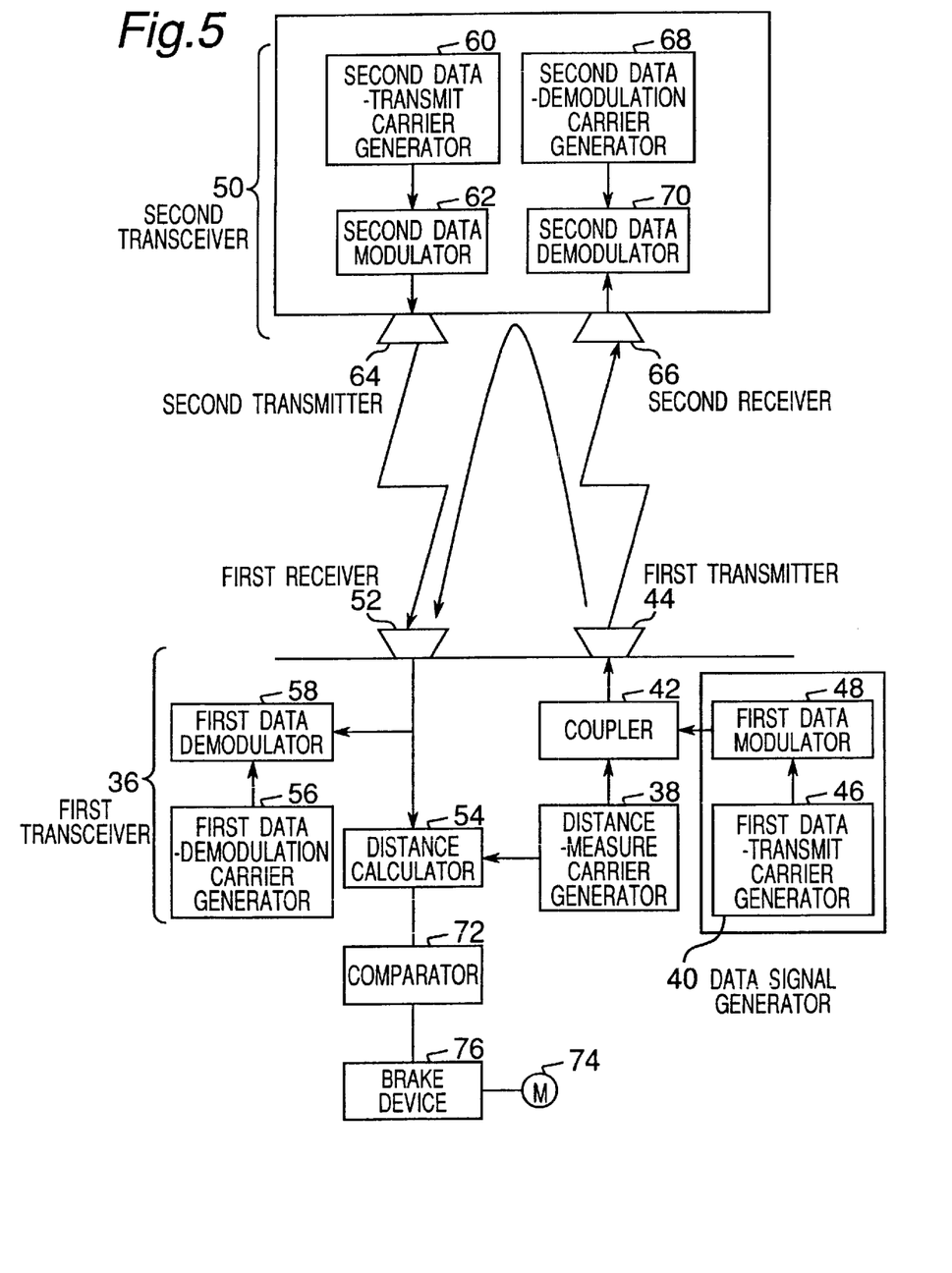
FIG. 5 is a block diagram of the elevator system of the transceivers of Embodiment 3, illustrating a structure thereof.

In Embodiments 1 and 2, the position and the moving speed of the elevator cage are determined based upon the carrier wave reflecting at the elevator cage. In Embodiment 3, the carrier transmitted from the first transmitter 44 of the first transceiver 36 is received at the second receiver 66 of the second transceiver 50. The second data demodulator 70 decouples the distance-measure carrier from the received carrier, which in turn is forwarded to the second data modulator 62. Then, the second data modulator 62 may again modulates the distance-measure carrier in accordance with data signals to be transmitted to the first transceiver 36 so that the second transmitter 64 transmits the carrier to the first transceiver 36. In other words, the distance-measure carrier transmitted from the first transmitter 44 is echoed back through the second receiver 66, the second data demodulator 70, the second data modulator 62, and the second transmitter 64. Thus, the distance calculator (or the moving speed calculator) 54 determines the position of the elevator cage by comparing the distance-measure carrier received at the first receiver 52 and the distance-measure carrier directly output from the distance-measure carrier generator 38.

Figure 6:
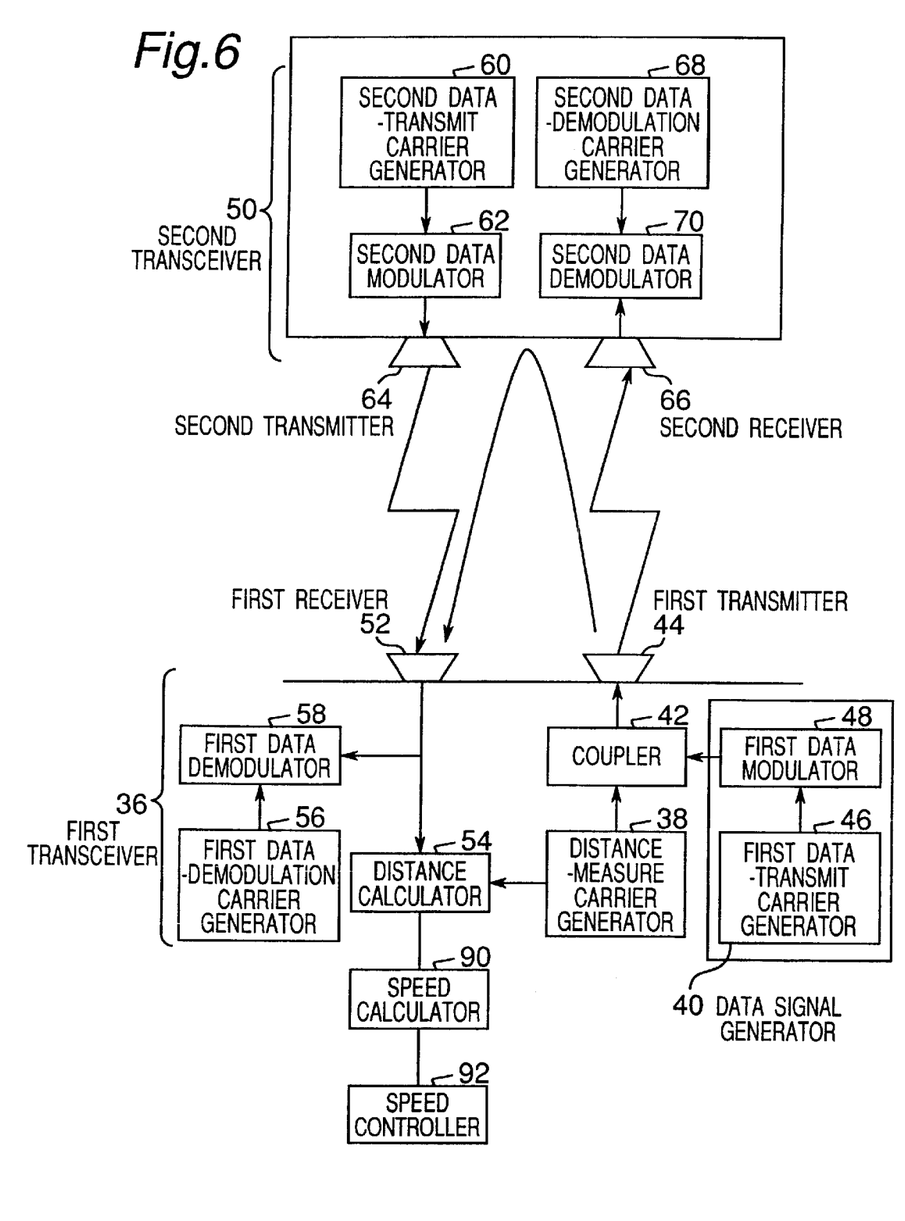
FIG. 6 is a block diagram of the elevator system of the transceivers of a modification of Embodiment 3, illustrating a structure thereof.

As illustrated in FIG. 6, the speed calculator 90 is provided for calculating the moving speed based upon the calculated distances of the elevator cage 20. The speed controller 92 uses the calculated moving speed to control the speed of the driving motor for moving the elevator cage 20. This embodiment is applied to any other above-mentioned embodiments.

With reference to the elevator system, the techniques have been discussed about how to determine the distance (speed) between a plurality of bodies relatively moving to each other, as well as about how to communicate data therebetween by means of the millimeter waves. However, the techniques can also be applied to any type bodies relatively moving to each other. For example, even in case where one body is fixed and the other body is moving, or both bodies are moving, the technique can be used for determining the relative distance (relative speed) between the bodies and for communicating data therebetween.

What is claimed is:

1. An elevator system comprising:
   a first portion positioned in an elevator shaft;
   a second portion positioned in the elevator shaft, vertically moving relative to said first portion, wherein both of said first and second portions move vertically along the elevator shaft;
   a first millimeter wave transceiver located at said first portion; and
   a second millimeter wave transceiver located at said second portion, said first and second transceivers communicating using millimeter waves.

2. An elevator system comprising:
   a first portion positioned in an elevator shaft;
   a second portion positioned in the elevator shaft, vertically moving relative to said first portion; and
   a transceiver located at one of said first and second portions, for transmitting millimeter waves to the other of said first and second portions, and for receiving millimeter waves reflected from the other of said first and second portions, to determine distance between said first and second portions, both of said first and second portions moving vertically along the elevator shaft.

3. The elevator system according to claim 1, wherein one of said first and second millimeter wave transceivers transmits the millimeter waves and then receives millimeter waves reflected at the other of said first and second portions, to determine a distance between said first and second portions.

4. An elevator system comprising:
a first portion positioned in an elevator shaft;
a second portion positioned in the elevator shaft and vertically moving relative to said first portion;
a first transceiver located at said first portion; and
a second transceiver provided at said second portion wherein each of said first and second transceivers includes,
a carrier wave generator for generating a carrier wave,
a modulator for modulating the carrier wave in accordance with communication data,
a transmitter for transmitting the carrier wave, modulated by said modulator, towards the other of said first and second transceivers,
a receiver for receiving the carrier wave transmitted by the other of said first and second transceivers, and
a demodulator for demodulating the communication data modulated on the carrier wave and received by said receiver; and
one of said first and second transceivers includes a distance calculator for calculating a distance between said first and second portions in accordance with the carrier wave.

5. An elevator system comprising:
a first portion positioned in an elevator shaft;
a second portion positioned in the elevator shaft and vertically moving relative to said first portion;
a first transceiver located at said first portion; and
a second transceiver provided at said second portion wherein one of said first and second transceivers includes,
a carrier wave generator for generating a carrier wave, and
a transmitter for transmitting the carrier wave towards the other of said first and second transceiver;
the other of said first and second transceivers includes,
a receiver for receiving the carrier wave transmitted by the one of said first and second transceivers,
a modulator for modulating the carrier wave in accordance with communication data, and
a transmitter for transmitting the carrier wave modulated by said modulator towards the other of said first and second transceivers; and
one of said first and second transceivers further includes,
a receiver for receiving the carrier wave transmitted from the other of said first and second transceivers, and
a demodulator for demodulating the communication data modulated on the carrier wave received by said receiver, and
one of said first and second transceivers includes a distance calculator for calculating distance between said first and second portions in accordance with the carrier wave.

6. The elevator system according to claim 4, further comprising:

a speed calculator for calculating moving speed of said second portion relative to said first portion, based upon the distance; and
a speed controller for controlling the moving speed of said second portion.

7. The elevator system according to claim 5, further comprising:
a speed calculator for calculating moving speed of said second portion relative to said first portion, based upon the distance; and
a speed controller for controlling the moving speed of said second portion.

8. The elevator system according to claim 6, further comprising:
a power source extending along the elevator shaft; and
a power inductor located at said second portion for receiving power from said power source by electromagnetic induction, without direct contact, wherein said second transceiver is supplied with the power from said power inductor.

9. The elevator system according to claim 7, further comprising:
a power source extending along the elevator shaft; and
a power inductor located at said second portion for receiving power from said power source by electromagnetic induction, without direct contact, wherein said second transceiver is supplied with the power from said power inductor.

10. The elevator system according to claim 6, further comprising a brake device for braking a driver of said second portion when the distance between said first and second portions calculated by said distance calculator is less than a danger distance.

11. The elevator system according to claim 7, further comprising a brake device for braking a driver of said second portion when the distance between said first and second portions calculated by said distance calculator is less than a danger distance.

12. The elevator system according to claim 8, further comprising a power cutoff for disabling said power source for supplying power through said power inductor when the distance between said first and second portions calculated by said distance calculator is less than a danger distance.

13. The elevator system according to claim 9, further comprising a power cutoff for disabling said power source for supplying power through said power inductor when the distance between said first and second portions calculated by said distance calculator is less than a danger distance.

14. The elevator system according to claim 4,
wherein the carrier wave is a millimeter wave.

15. The elevator system according to claim 5,
wherein the carrier wave is a millimeter wave.

16. An elevator system comprising:
a fixed portion positioned in an elevator shaft;
a first movable portion vertically moving in the elevator shaft relative to said fixed portion;
a second movable portion positioned in the elevator shaft so that said first portion intervenes between said fixed portion and said second portion, said second portion vertically moving relative to said fixed portion and said first movable portion; and
first, second, and third transceivers located at said fixed, first, and second portions, respectively wherein said first and third transceivers communicate with each other through said second transceiver.

* * * * *